United States Patent [19]

DeMola

[11] 3,908,728
[45] Sept. 30, 1975

[54] TIRE REMOVING TOOL

[76] Inventor: Louis D. DeMola, 810 Danehurst Ave., Glendora, Calif. 91740

[22] Filed: Jan. 6, 1975

[21] Appl. No.: 538,573

[52] U.S. Cl. ................................ 157/1.22; 157/1.3
[51] Int. Cl.² ........................................ B60C 25/02
[58] Field of Search ..................... 157/1.22, 1.24, 1.3

[56] References Cited
UNITED STATES PATENTS
2,508,069   5/1950   Lowry ................................. 157/1.3

FOREIGN PATENTS OR APPLICATIONS
388,694   8/1908   France .............................. 157/1.22
529,156   11/1921   France .............................. 157/1.22
646,059   11/1950   United Kingdom ............... 157/1.22

OTHER PUBLICATIONS
Popular Science, May, 1940, pp. 94.

*Primary Examiner*—Al Lawrence Smith
*Assistant Examiner*—Harold P. Smith, Jr.

[57] ABSTRACT

A tire moving tool manually operable to remove tubeless tires from rims. An elongated bar has a first tip at one end which is adapted to be forced between the inner periphery of the tire and the outer periphery of the rim. A collar slidable along the bar can be locked in desired position. An extension is secured to the collar and is disposed at right angles to the bar. A second tip secured to the extension is parallel to the bar and points toward the first tip. The extension and second tip engage the inner periphery of the rim at its center opening when the first tip is forced between tire and rim to hold the bar in place.

4 Claims, 4 Drawing Figures

TIRE REMOVING TOOL

SUMMARY OF THE INVENTION

In order to remove a tubeless tire from a rim, it is known that one end of a bar must be forced between the inner periphery and the outer periphery of the rim to enable the tire to be pulled out of the rim. However, the inner pressure of air within the tire acts to restore the tire to its original position and to force the bar out of position. To prevent this restoring action, a second bar is normally employed and the user can only use one hand for each bar. Best results are obtained when the original bar is operated with both hands.

In this invention, a bar has a first tip at one end adapted to be forced between tire and rim. A collar is slidable along the bar. An extension on the collar is disposed at right angles to the bar. A second tip parallel to the bar is secured to the extension and points to the first tip. The extension and second tip engage the inner periphery of the rim in a central hole when the first tip is forced between the tire and the rim.

As a result only one bar is used and can be operated by both hands.

To further facilitate operation, the first tip can have a transverse groove for engaging the bead of the rim thereby providing additional gripping action.

DETAILED DESCRIPTION OF PREFERRED EMBODIMENTS

Figure 1:
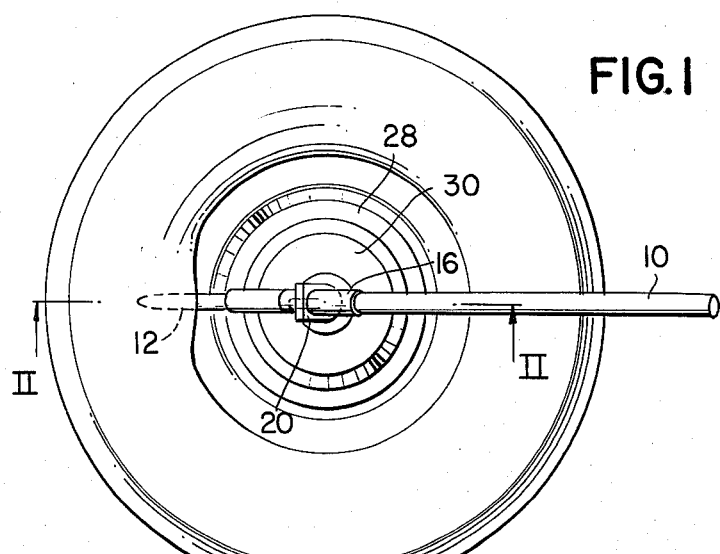
FIG. 1 is a top view of the invention in use.
Figure 2:
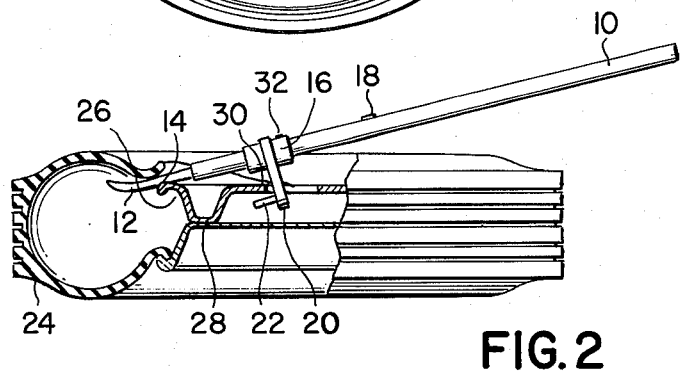
FIG. 2 is a view taken along line 2—2 in FIG. 1.
Figure 4:
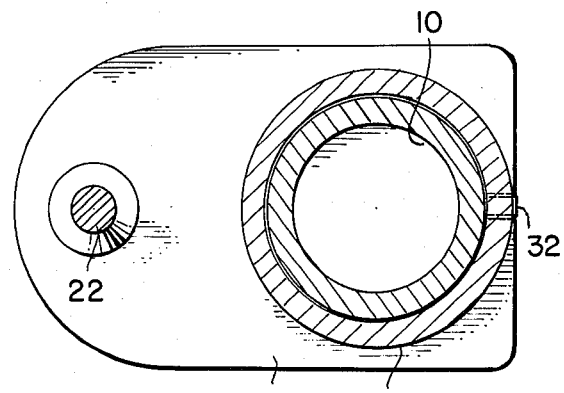
FIG. 4 is a view taken along line 4—4 in FIG. 3.
Figure 3:
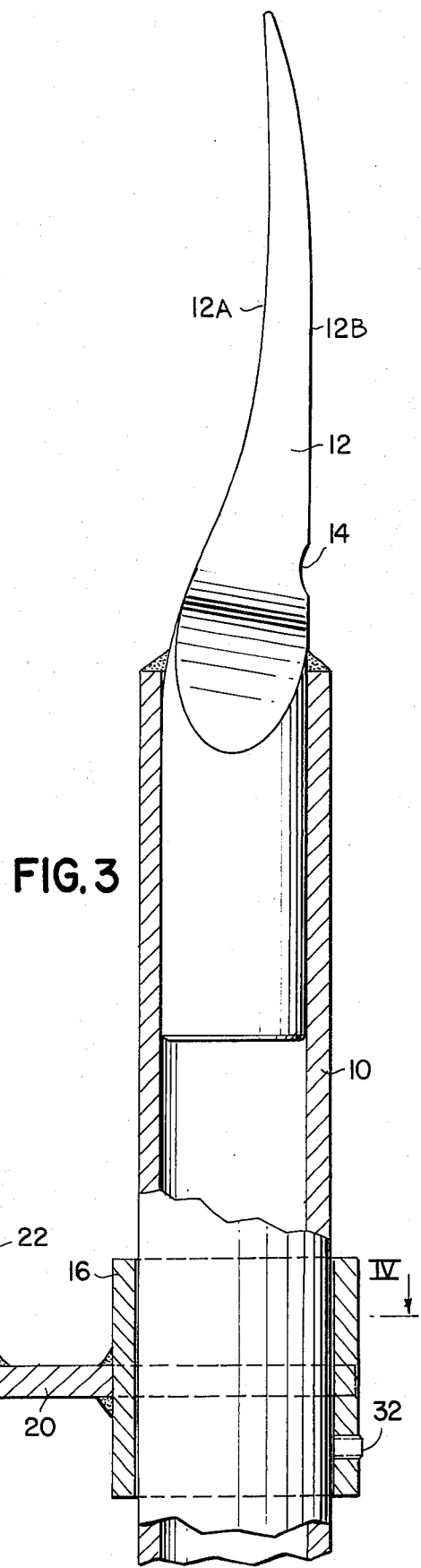
FIG. 3 is an enlarged detail side view of the invention.

Referring now to FIGS. 1–4, a hollow metal bar 10 has a removable tip 12 which flares outward with one upper surface 12A being essentially flat and a lower surface 12B which is curved and has a transverse bead receiving groove 14.

A collar 16 is slidable along the bar between the flared end of the tip and a stop 18 on the bar disposed intermediate the ends. The collar has an integral extension 20 disposed at right angles to the bar and a cylindrical second tip 22 parallel to the bar and pointing toward the tip 12. A set screw 32 can be used to lock the collar in position.

Tubeless tire 24 is secured to bead 26 on the outer periphery of rim 28. The rim has a center opening with an inner periphery 30.

In use, the tip 12 is forced between tire and rim with bead 26 engaged by groove 14 and periphery 30 engaged by extension 20 and tip 22.

While the invention has been described with detailed reference to the drawings, the protection sought is to be limited only by the terms of the claims which follow.

I claim:

1. A tire removing tool comprising:
   an elongated bar having means at a first tip thereof for forcing the inner periphery of a tire on a rim across the outer periphery of the rim, the rim having a central hole with an inner periphery;
   a collar slidable along the bar;
   an extension secured to the collar and extending outward at right angles to the bar; and
   a second tip secured to the extension, parallel to the bar and pointing toward the first tip, said extension and second tip being adapted to engage the inner periphery of the rim.

2. The tool of claim 1 wherein the collar has means to lock same to the bar in desired position.

3. The tool of claim 2 wherein the first tip flares outward whereby the collar cannot slide theroff, the bar having a stop disposed between the collar and the other end of the bar to prevent the collar from sliding thereoff.

4. The tool of claim 3 wherein said forcing means has a transverse groove adapted to detachably engage the bead of the rim.

* * * * *